Dec. 9, 1941.   J. FIEDLER   2,265,690
APRON
Filed Jan. 17, 1940   2 Sheets-Sheet 1
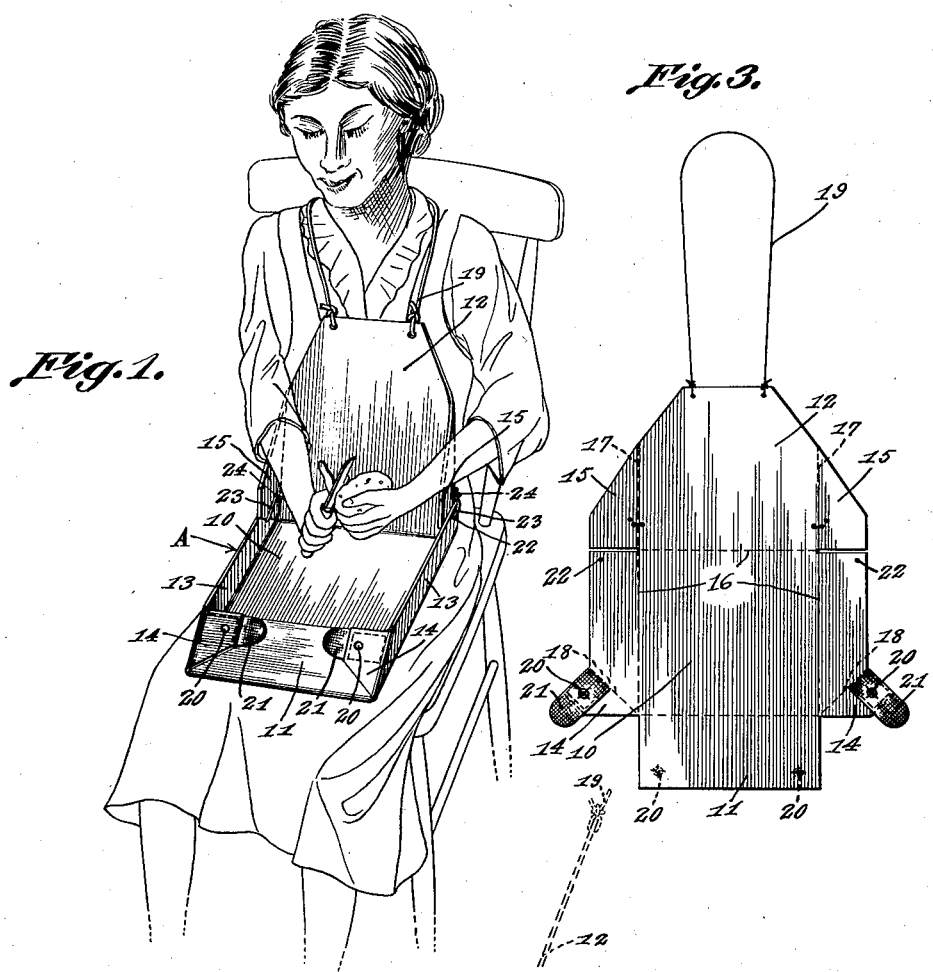
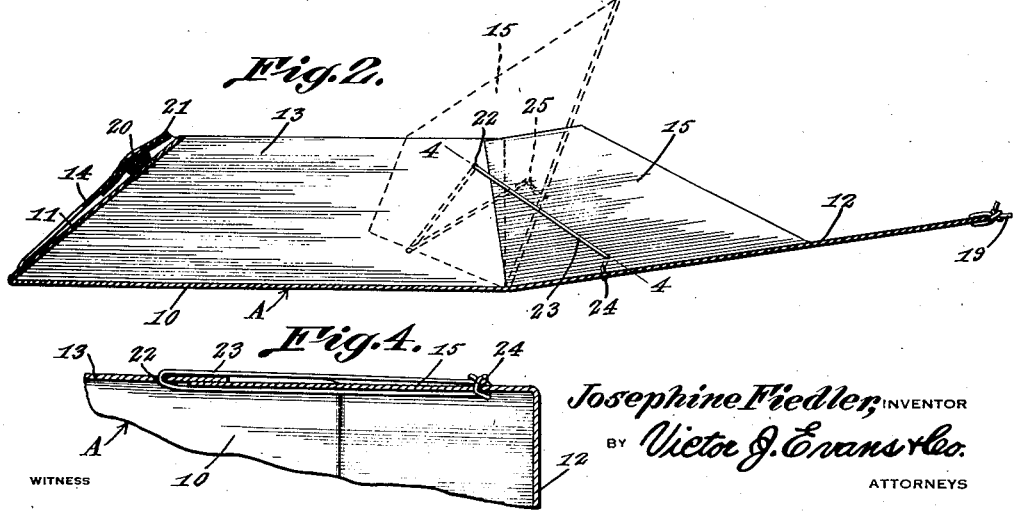
Josephine Fiedler, INVENTOR
BY Victor J. Evans & Co.
WITNESS   ATTORNEYS Dec. 9, 1941.     J. FIEDLER     2,265,690
APRON
Filed Jan. 17, 1940     2 Sheets-Sheet 2
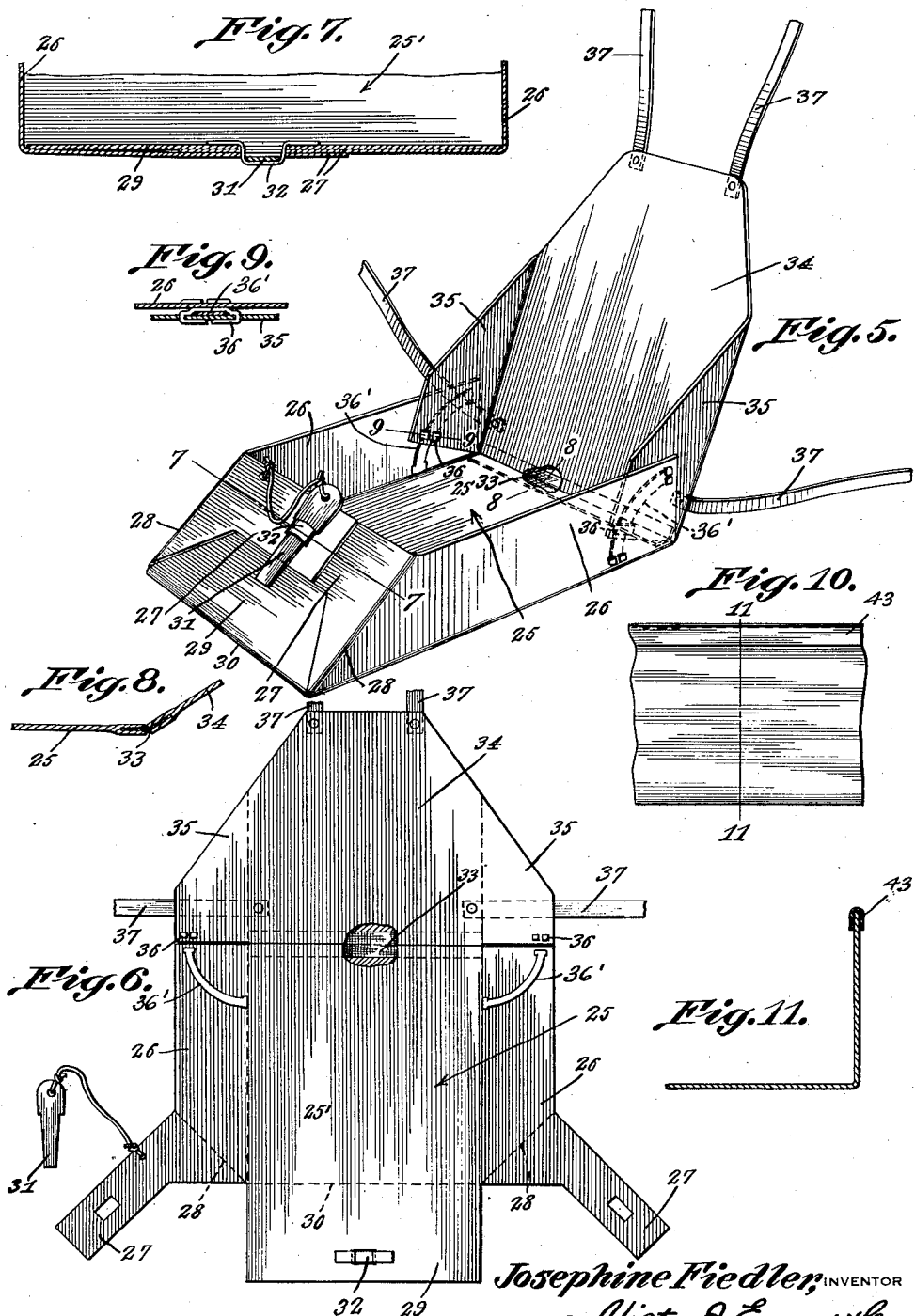
Josephine Fiedler, INVENTOR
BY Victor J. Evans & Co.
ATTORNEYS
WITNESS Patented Dec. 9, 1941

2,265,690

UNITED STATES PATENT OFFICE 2,265,690

APRON

Josephine Fiedler, Ledger, Mont.

Application January 17, 1940, Serial No. 314,343

1 Claim. (Cl. 2—49)

The invention relates to an apron and more especially to a tray-forming kitchen apron.

The primary object of the invention is the provision of an apron of this character wherein in the use thereof when preparing vegetables, fruits or other edibles, especially when peeling, paring or slicing the vegetables or fruit or the cleaning or otherwise preparing of the same, the waste or the prepared vegetables, fruits or the like will not fall upon the floor but will be caught in a receiver constituting a part of the apron and in this manner relieving the user of the latter of excessive labor resultant from the spilling of the work as often occurs without the wearing of the apron.

Another object of the invention is the provision of an apron of this character wherein the waste or other matter caught therein during the preparation of vegetables, fruits or the like for the subsequent cooking or serving thereof can be handled and dumped into a garbage receptacle without liability of the scattering of the waste or the soiling of the clothing of a person active in the preparation of the said vegetables, fruits or the like.

A further object of the invention is the provision of an apron of this character wherein the construction permits of the setting up of the same for wearing and the collapsing or folding into compact condition when not in use and also conditioning the same for storage in the least possible space.

A still further object of the invention is the provision of an apron of this character, which is simple in its construction, thoroughly reliable and efficient in operation, convenient, easily handled, possessed of lasting qualities or maximum wear, and inexpensive to manufacture.

With these and other objects in view, the invention consists in the features of construction, combination and arrangement of parts as will be hereinafter more fully described in detail, illustrated in the accompanying drawings, which disclose the preferred and modified forms of embodiment of the invention and pointed out in the claim hereunto appended.

In the accompanying drawings:

Figure 1 is a perspective view of an apron constructed in accordance with the invention and in position for the wearing thereof and for use.

Figure 2 is an enlarged vertical longitudinal sectional view through the apron.

Figure 3 is a plan view of the apron disclosing its pattern prior to the setting up of the same for use.

Figure 4 is a sectional view taken on the line 4—4 of Figure 2.

Figure 5 is a perspective view of a modified form of apron set up for use.

Figure 6 is a view similar to Figure 3 disclosing the pattern of the modified form thereof shown in Figure 5 and collapsed.

Figure 7 is a sectional view taken on the line 7—7 of Figure 5.

Figure 8 is a sectional view taken on the line 8—8 of Figure 5.

Figure 9 is a fragmentary sectional view taken on the line 9—9 of Figure 5.

Figure 10 is a fragmentary side elevation of a further modification of the invention.

Figure 11 is a sectional view on the line 11—11 of Figure 10.

Similar reference characters indicate corresponding parts throughout the several views in the drawings.

Referring to the drawings in detail, particularly Figures 1 to 4, inclusive, which illustrates the preferred embodiment of the invention, A designates generally the apron constructed in accordance with the invention and comprises a blank of sheet-like material, preferably stiff fibrous kind, cut to form a collapsible tray-like body. This body includes a bottom 10, front and rear walls 11 and 12, respectively, side walls 13 and extension wings or flaps 14 and 15, respectively. The walls 11, 12 and 13 are foldable on weakened or crease lines 16 following straight lines about the bottom 10. The wings or flaps 14 and 15 are foldable on weakened or crease lines 17 and 18, respectively, the flaps 14 being formed from the side walls 13 while the flaps 15 are formed from the rear wall 12. The rear wall 12 in conjunction with the wings or flaps 15 is bevel edged for outwardly tapering formation and fastened to the smaller end of the rear wall 12 is a flexible neck loop 19.

The tray-like body through the rear end wall 12 thereof has the latter effective as an apron portion when wearing the loop 19 about the neck of a user and on the setting up of the said tray-like body, which is normally in a collapsed or unfolded condition. This apron portion, which is an extension of the rear end wall 12 of the tray-like body, is adapted to cover a body garment when worn at the front of a wearer for protection to such garment and functions for the same purpose as the upper portion of the ordinary kitchen apron.

In the setting up of the tray-like body of the apron, the walls 11, 12 and 13 are brought to an upstanding position with respect to the bottom 10 being folded on the lines 16 while the flaps 14 of the side walls 13 are brought into overlapping relation to the front wall 11 where these flaps are separably joined by snap fasteners 20 thereto. The flaps 14 are preferably provided with pull tabs 21 to allow for the easy separation of the snap fasteners 20 and such tabs 21 are located outwardly of the front wall 11 when the flaps 14 are snap fastened thereto at the outer side of the same. The flaps 15 are folded on the lines 17, while the flaps 14 are foldable on the lines 18. These flaps 15 lie in overlapped relation to the folded side walls 13. The crease line 16 between the bottom 10 and the rear wall 12 is effective as a hinge between the bottom 10 and the said rear wall 12 on the wearing of the apron. Trained through a suitable hole 22 provided in each side wall 13 considerably removed from the crease line 16 between the bottom 10 and the rear wall 12 is a tie string 23 which is looped through the flap 15, as at 25, and permanently tied at each side of the tray-like body so as to limit the swing of the said tray-like body and rear wall 12 relative to each other when moved away from one another.

The wearing of the apron constructed in the manner as before set forth is clearly illustrated in Figure 1 when the said apron is set up for use. The collapsed or unfolded condition of the apron is shown in Figure 3 of the drawings, the entire structure being flat, and to allow for this the tie strings 23 are untied.

The front wall 11 of the tray-like body, by reason of the angular disposition of the tabs 14 when the apron is set up for use, will be fastened at a forwardly inclined position, as is shown in Figure 2 of the drawings to assure the retention of waste or substances caught in the tray-like body when a wearer of the apron is actively engaged in the preparation of vegetables, fruits or the like for their consumption.

In Figures 5 to 9 of the drawings there is shown a modification of the invention wherein the tray-like body 25 has the two side walls 26 provided with foldable tongues 27. These tongues are foldable on the crease lines 28 and such are adapted to overlap each other in the setting up of the body 25. The front wall 29 is foldable on a crease line 30 to be disposed inside of the tongues 27 when these are overlapped so that it can be engaged by a fastening key 31 releasably insertable in a keeper loop 32 accommodated in the front wall 29 and in suitable openings in the tongues 27 thereby fastening together the said tongues and front wall. The bottom 25' of the tray-like body has a flexible strip hinge 33 connecting it to the rear wall 34 having an apron-like formation. The outer faces of the flaps 35 are provided with staples 36 which encircle the segmental plates 36', carried by the inner faces of the side walls 26, whereby the rear wall 34 is maintained in its adjusted position in respect to the main body portion. In other words, the rear wall 34 and the tray-like body 25 are susceptible of movements relative to each other.

The rear wall 34 has attached thereto tie strings 37 for fastening about the body of a wearer in the use of the apron and in this fashion the latter is harnessed to such wearer.

In Figures 10 and 11 of the drawings there is shown a further modification of the invention wherein the uppermost free edges of the walls of the tray-like body are protected and reinforced by a tape-like binder or edge strip 43 of fabric kind.

When the apron is worn, the tray-like body thereof is held at rest in the lap of the user and the rear wall rising from this body assumes the position as shown in Figure 1 of the drawings when the neck loop 19 is about the neck of a wearer. This loop hangs the apron upon the wearer while the tray-like body will be in a position for catching waste when preparing vegetables or fruits for serving or cooking.

The formations of the flaps 27 hereinbefore described and the front wall 29 permit of the jointure of the said flaps 27 with each other without joining the front wall 29 therewith. This is accomplished by removing the key 31 from the keeper loop 32 and disengaging the latter from the front wall 29, which frees the latter, and engaging the said keeper loop with the clearances provided in the flaps 27 and thereafter inserting the pin 31 in the keeper loop, which will fasten the said flaps 27 together so that the front wall 29 can be opened. On the opening of the front wall 29, the contents of the tray-like body can be readily dumped or discharged therefrom through the front end of the said body as the flaps 27 create a discharge clearance below the overlapped portions of these flaps.

The apron, when set up for use for the purposes before mentioned, enables the collecting or trapping of waste and also permits of the convenient dumping of the waste into a garbage receptacle as well as the collapsing of the apron so that it can be placed in the least possible space for storage or when not in use.

What is claimed is:

An apron comprising a tray-like body formed from a suitably stiffened sheet of material and including bottom, front and rear, and side walls, the rear wall extending substantially above the side walls, a neck engaging loop connected to the upper end of the rear wall, flaps extending from opposite edges of the rear wall in overlapping relation to the side walls, and adjustable connections between said flaps and side walls for varying the angular relation between the rear and bottom walls.

JOSEPHINE FIEDLER.